United States Patent
Showalter et al.

(10) Patent No.: US 10,461,621 B2
(45) Date of Patent: Oct. 29, 2019

(54) MICRO SCALE ELECTRO HYRDODYNAMIC (EHD) MODULAR CARTRIDGE PUMP

(71) Applicant: U.S.A. as represented by the Administrator of the National Aeronautics and Space Administration, Washington, DC (US)

(72) Inventors: Matthew T. Showalter, Severn, MD (US); Jeffrey R. Didion, Greenbelt, MD (US); Mario S. Martins, Edgewater, MD (US); Franklin L. Robinson, Baltimore, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 819 days.

(21) Appl. No.: 14/981,165

(22) Filed: Dec. 28, 2015

(65) Prior Publication Data

US 2017/0184081 A1 Jun. 29, 2017

(51) Int. Cl.
*H02K 44/04* (2006.01)
*F04B 19/00* (2006.01)

(52) U.S. Cl.
CPC .......... *H02K 44/04* (2013.01); *F04B 19/006* (2013.01)

(58) Field of Classification Search
CPC ....... F04B 19/006; F04B 37/02; H02K 44/02; H02K 44/04
See application file for complete search history.

(56) References Cited

U.S. PATENT DOCUMENTS 3,008,418 A * 11/1961 Blake ..................... H02K 44/04
310/11
2008/0118370 A1* 5/2008 Zoulkarneev ......... F04B 19/006
417/50

\* cited by examiner

*Primary Examiner* — Bryan M Lettman
(74) *Attorney, Agent, or Firm* — Matthew F. Johnston; Bryan A. Geurts (57) ABSTRACT

An electro hydrodynamic pump apparatus includes a cartridge body member that includes an interior cavity portion and openings on either end of the cartridge body member. A first electrode member is disposed within the interior cavity portion of the cartridge body member. The first electrode member includes a conductive bar member which has a plurality of spaced apart elements extending therefrom. A second electrode member is also disposed within the interior cavity portion of the cartridge body member. The second electrode member also includes a conductive bar with a plurality of spaced apart elements extending therefrom. The elements of the first electrode member are configure to be interspersed with the elements of the second electrode member when the first electrode member and the second electrode member are disposed within the interior cavity portion of the cartridge body member.

11 Claims, 13 Drawing Sheets

MICRO SCALE ELECTRO HYRDODYNAMIC (EHD) MODULAR CARTRIDGE PUMP

ORIGIN OF THE INVENTION

The invention described herein was made by an employee of the United States Government and may be manufactured and used by or for the Government for Government purposes without the payment of any royalties thereon or therefore.

BACKGROUND

Field

The aspects of the present disclosure relate generally to electro hydrodynamic pumps and more particularly to a small scale electro hydrodynamic pump.

Description of Related Art

Electro hydrodynamic (EHD) conduction pumping relies on the interaction between electric fields and dissociated charges in dielectric fluids. EHD pumps are small, have no moving parts and offer superior performance for heat transport.

Typical electro hydrodynamic pumps are large devices with complex component counts and geometry. The designs are limited in the ability to be utilized in practical applications
by both size and component complexity, as well as the inability to access the pumps for service or replacement. There can also be reliability issues in maintaining electrical connectivity.

Accordingly, it would be desirable to provide an electro hydrodynamic pump that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the disclosed embodiments relates to an electro hydrodynamic pump apparatus. In one embodiment, the apparatus includes a cartridge body including an interior cavity portion and openings on either end of the cartridge body. A first electrode member is disposed within the interior cavity portion of the cartridge body, the first electrode member comprising a conductive bar member with a plurality of spaced apart elements extending therefrom; a second electrode member is disposed within the interior cavity portion of the cartridge body, the second electrode member comprising a conductive bar with a plurality of spaced apart elements extending therefrom; wherein the elements of the first electrode member are configure to be interspersed with the elements of the second electrode member when the first electrode member and the second electrode member are disposed within the interior cavity portion of the cartridge body.

These and other aspects and advantages of the exemplary embodiments will become apparent from the following detailed description considered in conjunction with the accompanying drawings. It is to be understood, however, that the description and drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

Figure 1:
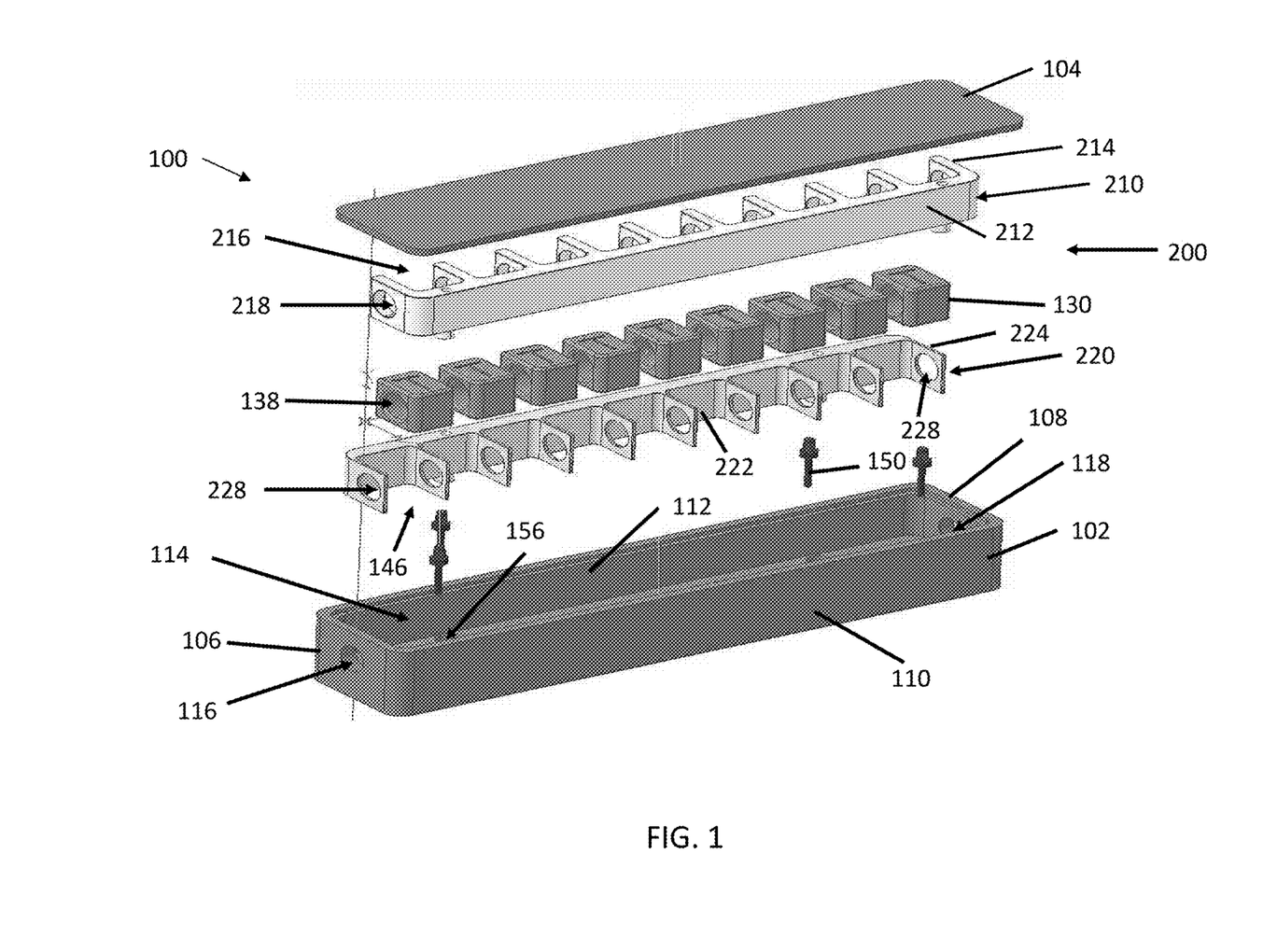
FIG. 1 illustrates an assembly block diagram of a micro-scale electro hydrodynamic modular cartridge pump incorporating aspects of the disclosed embodiments.

The aspects of the present disclosure are directed to a micro-scale electro hydrodynamic (EHD) modular cartridge pump that is configured to provide pumping of dielectric fluid in a thermal loop to dissipate heat generated by electrical components with low power consumption. FIG. 1 illustrates an assembly view of an EHD modular cartridge pump 100 incorporating aspects of the disclosed embodiments. The EHD modular cartridge pump 100 reduces the number of components required to make an EHD pump assembly, insures a solid reliable electrical connection to the electrodes that form the pumping sections and is modular in overall design to allow for flexibility in incorporating the pump cartridge into various assemblies and applications.

Figure 2:
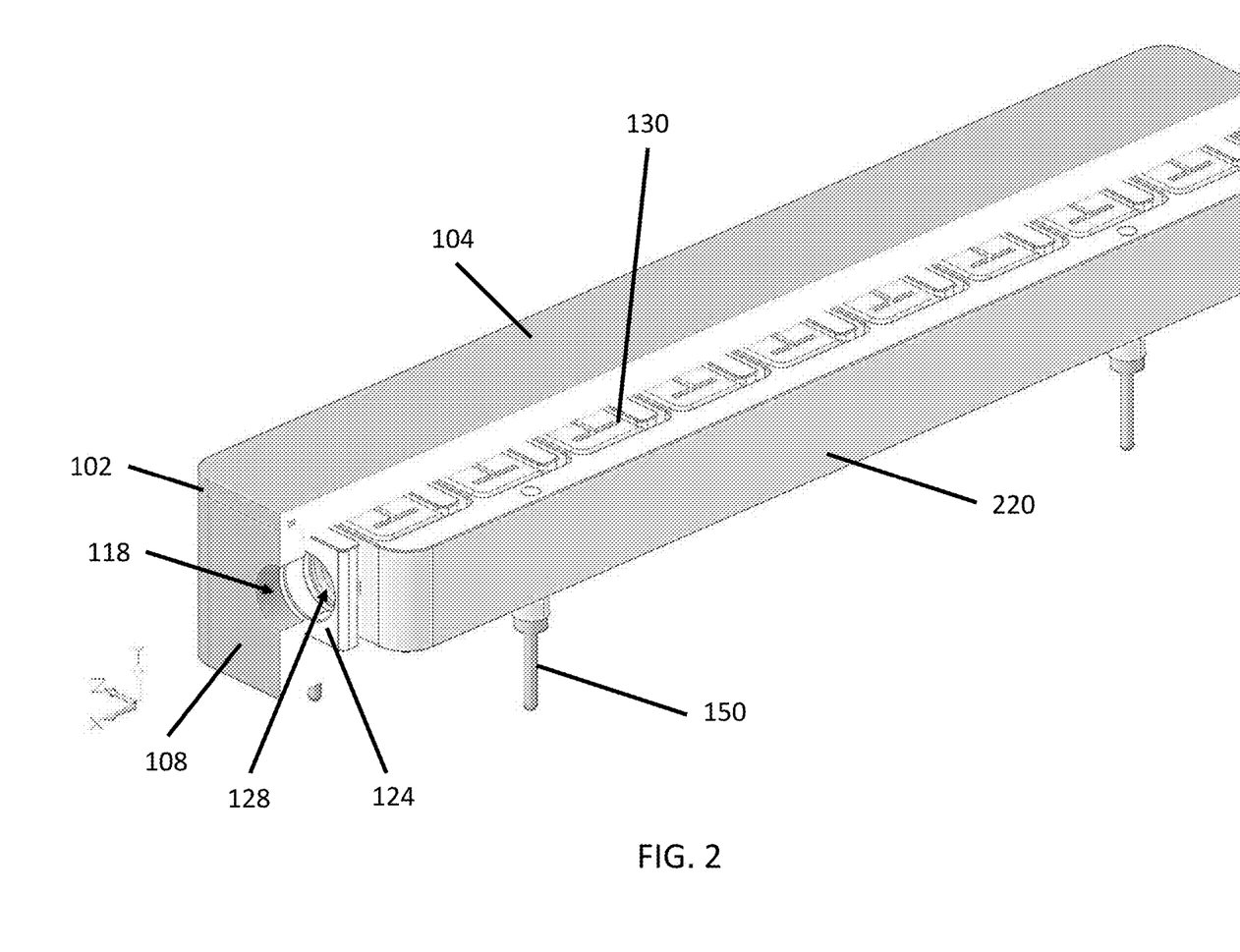
FIG. 2 illustrates a partial cross-sectional view of a micro-scale electro hydrodynamic modular cartridge pump incorporating aspects of the disclosed embodiments.
Figure 3:
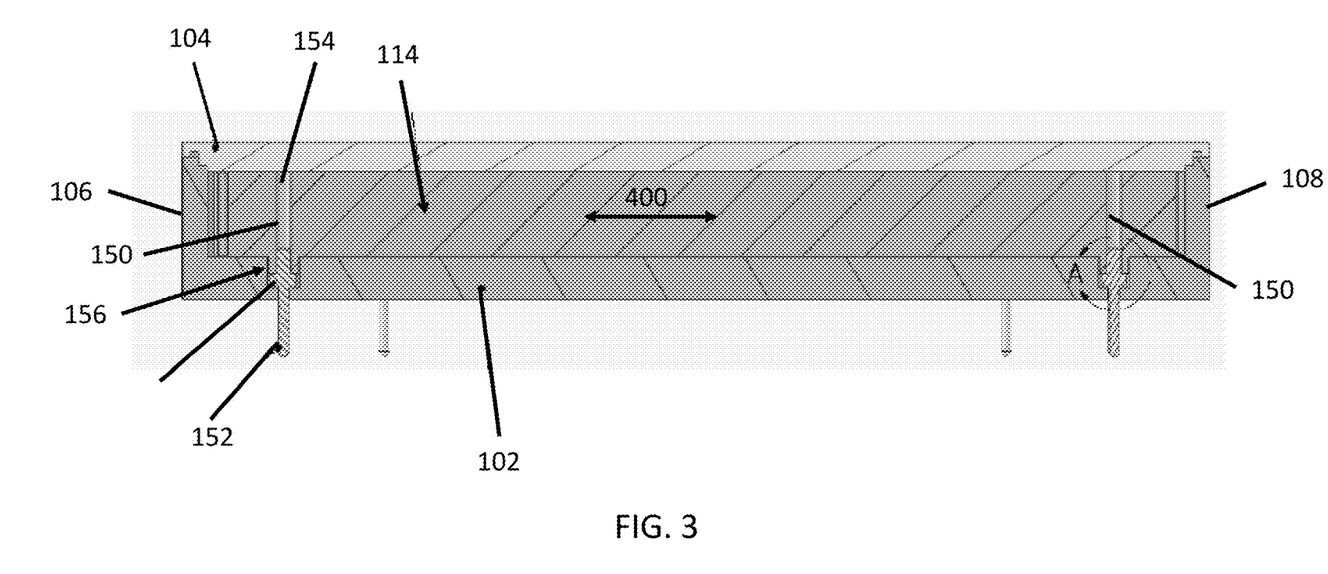
FIG. 3 illustrates a cross-sectional view of a micro-scale electro hydrodynamic modular cartridge pump incorporating aspects of the disclosed embodiments.

As is illustrated in FIGS. 1-3, the EHD modular cartridge pump 100 generally comprises a cartridge body 102, also referred to as a body member, and a cartridge case cover 104. The cartridge body 102 includes ends 106, 108 and sides 110, 112. The sides 106, 108 and ends 110, 112 define a cavity 114. There is an opening 116 in the end 106 and an opening 118 in the end 108. As will be further described herein, the openings 116, 118 define a flow channel 400 in the cavity 114 of the cartridge body 102.

The cartridge body 102 and cartridge case cover 104 generally comprise a non-conductive thermoplastic material. In one embodiment, the cartridge body 102 and cartridge case cover 104 comprise an insulated plastic material. An example of such a material is ULTEM™ 1000. In alternate embodiments, the cartridge body 102 and cartridge case cover 104 can comprise any suitable material for an EHD cartridge pump. The cartridge case cover 104 is configured to be secured to a top cover area of the cartridge body 102 in any suitable manner. When the cartridge case cover 104 is secured in place, any fluid in the cartridge pump 100 will be prevented from leaking out. In one embodiment, a size of the EHD modular cartridge pump 100 is approximately ⅜ inches wide by ½ inches tall. A length can be approximately 1 and ¼ inches. This is in comparison to EHD pumps of the prior art that could range 7 to 8 inches in length.

As is shown in FIG. 1, in one embodiment, the cartridge pump 100 includes an electrode assembly 200 comprising a first electrode 210 and a second electrode 220. The first electrode 210 and second electrode 220 comprise conductive members or elements and are generally formed from a one-piece construction. In one embodiment, the first electrode 210 and second electrode 220 comprises a stainless steel material, such as 316 stainless steel, for example. The use of one-piece construction to form the first electrode 210 and second electrode 220 provides for a more reliable electrical connection to a power source.

In one embodiment a thickness of the first electrode 210 is thicker than a thickness of the second electrode 220. For example, a thickness of the first electrode 210 can be approximately 0.0010 inches. The thickness of the second electrode 220 can be approximately 0.036 inches.

In the example of FIG. 1, the first electrode 210 comprises a high voltage electrode and is electrically connected to a power source, such as a high voltage power source suitable for an EHD cartridge pump. The second electrode 220 in the example of FIG. 1 comprises a ground electrode and is generally electrically connected or coupled to an electrical ground potential. In alternate embodiment, the first electrode 210 and the second electrode 220 can form any suitable electrode in accordance with the aspects of the present disclosure.

In one embodiment, the first electrode 210 and the second electrode 220 are coated with an insulating material. In the example of FIG. 1, the insulating material is Parylene. Parylene is the trade name for a variety of chemical vapor deposited poly(p-xylylene) polymers used as moisture and dielectric barriers. The use of Parylene as an insulation coating reduces or eliminates the need for fully enclosed insular spacers to contain the high voltages. In one embodiment, the Parylene is used to coat and insulate the electrodes for up to 6000 volts at 0.001 inch coating thickness.

The first electrode or electrode assembly 210 generally comprises a conductive element or conductive bar 212 and one or more elements 214 that extend away from the conductive bar 212. In one embodiment, the elements 214 are also conductive members. In one embodiment, the elements 214 are coated with Parylene™, with the exception of the surfaces of the through bores or openings 218. An example of this is described below with respect to FIG. 13.

In the example of FIG. 1, there are ten elements 214. In alternate embodiments, the first electrode 210 can include any suitable number of elements 214 depending upon the particular application. Generally, as will be also referenced below, there will be as many elements 214 on first electrode 210 as there are elements 224 on second electrode 222. The elements 210, 222 create a pumping pair of electrodes.

The elements 214 extend away from the conductive bar member 212 in a substantially orthogonal manner, or at approximately 90 degrees. The configuration of the first electrode assembly 210 can be described as a "comb" or "rake" configuration.

As is illustrated in FIG. 1, in one embodiment, a middle portion of the elements 214 defines openings 218. The openings 218 are configured to allow a fluid to flow through the openings 218. As will be further described herein, the openings 218 in the first electrode 210 are used to define the flow channel 400 through the cartridge body 102.

Figure 13:
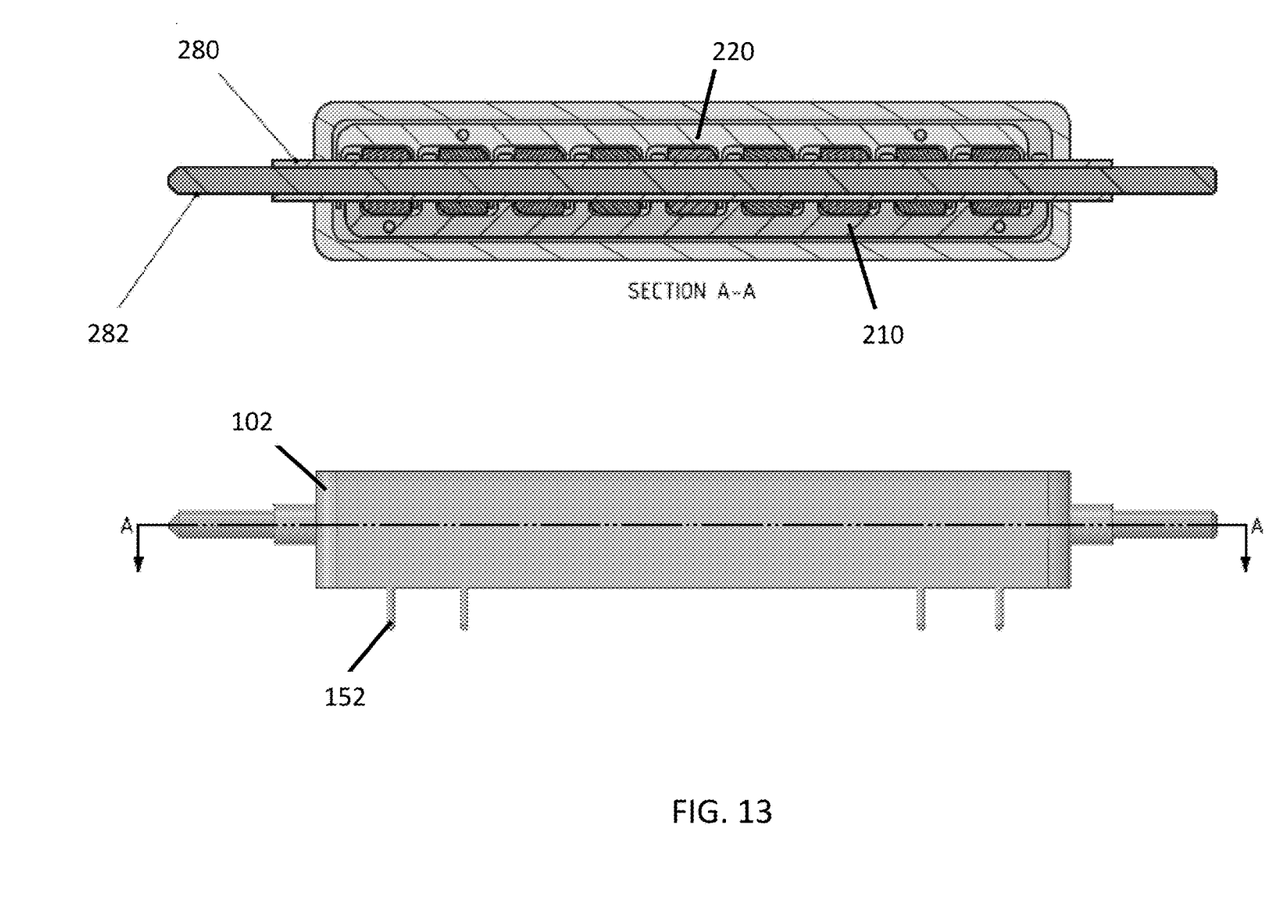
FIG. 13 illustrates the use of a masking material during a coating phase of the first and second electrodes for a micro-scale electro hydrodynamic modular cartridge pump incorporating aspects of the disclosed embodiments.

The EHD modular cartridge pump 100 also includes a second electrode 220. The second electrode 220, as is shown in FIG. 1, generally comprises a conductive element or conductive bar element 222 and includes one or more elements 224 that extend away from the conductive bar element 222. In one embodiment, the elements 224 are also conductive members are coated with Parylene™, with the exception of the surfaces of the through bores or openings 228. FIG. 13 illustrates the use of a masking material 280, such as for example Teflon™ to prevent the coating of the surfaces of the through bores 218, 228. In the example of FIG. 13, an expanding pin 282 has the masking material 280 disposed thereon. The masking material 280 is configured to prevent the internal through bore 218, 228 from being coated with the Parylene™.

In the example of FIG. 1, there are ten elements 224. In alternate embodiments, the first electrode 220 can include any suitable number of elements 224 depending upon the particular application. As referenced above, there will be as many elements 224 on second electrode 222 as there are elements 214 on first electrode 220. The elements 210, 222 create a pumping pair of electrodes.

In one embodiment, the elements 224 extend away from the conductive bar member 222 in a substantially orthogonal manner, or at approximately 90 degrees. The configuration of the second electrode assembly 220 can be described as a "comb" or "rake" configuration.

As is illustrated in FIG. 1, in one embodiment, the elements 224 will include an opening 228. The openings 228 are configured to allow a fluid to flow through the openings 228. As will be further described herein, the openings 228, together with the openings 218, are used to define the flow channel 400 through the cartridge body 102.

As noted above, the first and second electrodes 210, 220 are coated. In one embodiment, masking of the internal bore of the respective openings 218, 228 in the first and second electrode assemblies 210, 220 is accomplished using an expanding sleeve that effectively masks the bore inner diameter while allowing the Parylene to coat and insulate the rest of the electrode for up to 6K volts at 0.001 inch coating thickness.

Figure 4:
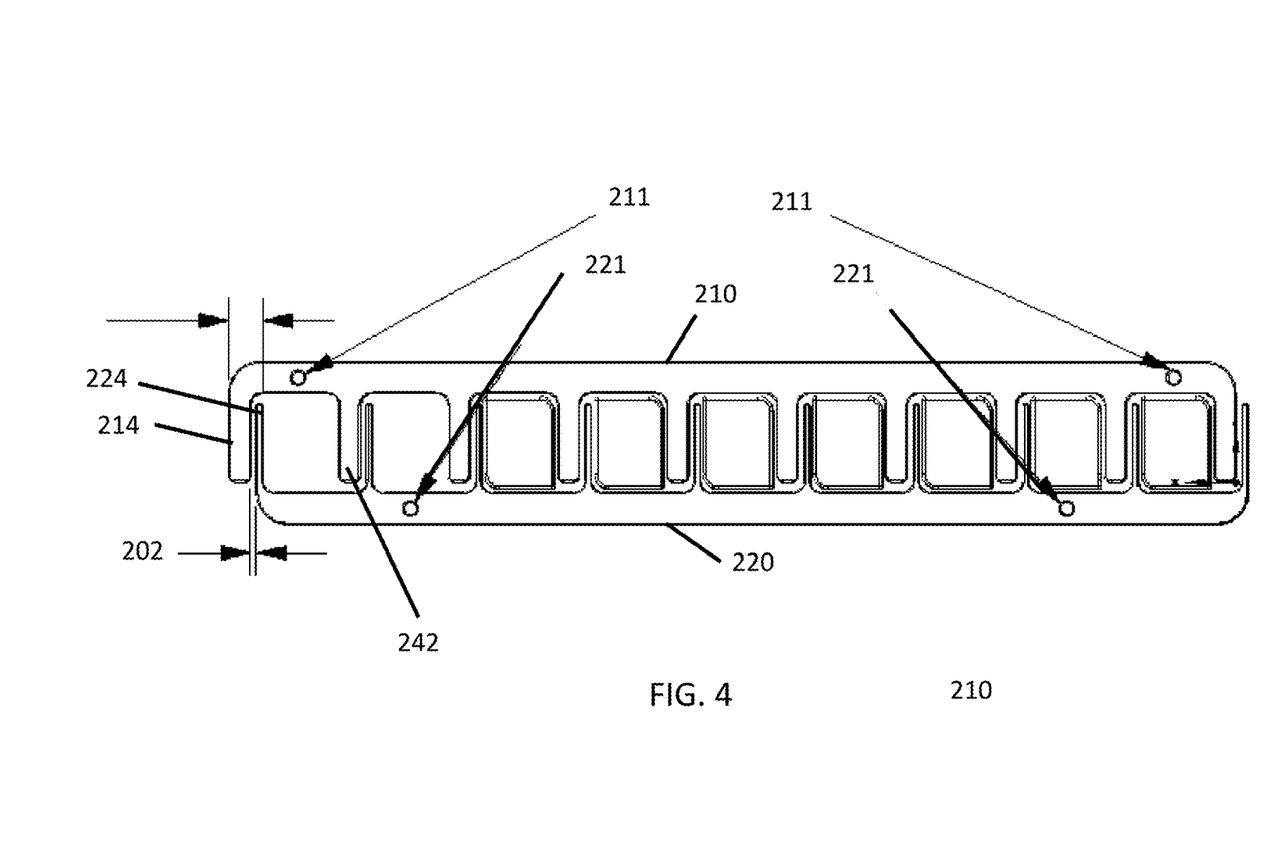
FIG. 4 is a top plan view illustrating first and second electrodes for a micro-scale electro hydrodynamic modular cartridge pump incorporating aspects of the disclosed embodiments.

In one embodiment, referring to FIG. 4, the spacing between adjacent elements 214 and 224 can vary. For example, as shown in FIG. 4, the spacing or gap 202 between element 214 of the first electrode 210 and element 224 of the second electrode 220 is of a first dimension. In one embodiment, the spacing or gap 202 has an assembly dimension of approximately 0.010 inches. The spacing or gap 204 between the element 242 of the first electrode 210 and element 224 of the second electrode 220 is of a second dimension. In one embodiment, the spacing or gap 204 has an assembly dimension of approximately 0.126 inches.

In the example of FIG. 4, the first dimension 202 202 between element 214 of the first electrode 210 and element 224 of the second electrode 220 is greater than the second dimension between the element 242 of the first electrode 210 and element 224 of the second electrode 220. The spacing or gap 202 is a critical gap for pumping. Generally, two electrode elements 214, 224 plus the gap 202 will define one pumping section. As will be discussed further herein, in one embodiment, the second dimension or spacing is configured to receive or accommodate a spacer element. In the example of FIG. 4, there are 10 pumping sections defined.

Referring to FIGS. 1, 2 and 4, for example, in one embodiment, the EHD cartridge pump 100 also includes one or more spacer elements 130, also referred to as "flow channel spacers" 130. The spacer elements 130 are generally configured to be disposed between the different elements 214 of the first electrode 210 and the different elements 224 of the second electrode 220.

In one embodiment, the spacer elements 130 include openings 138. In an embodiment where the EHD cartridge pump 100 includes the spacer element 130, the openings 138 in the spacer elements 130, together with the openings 218, 228 will define the flow channel 400 through the cartridge body 102 as will be further described herein.

The material of the spacer elements 130 is generally a non-conductive material. In alternate embodiments, the spacer elements 130 can comprise any suitable material. The size of a spacer element 130 will generally correspond to a distance between an element 214 of the first electrode 210 and an element 224 of the second electrode 220, defined with respect to FIG. 4 as the second dimension. In one embodiment, the space element 130 comprises ULTEM™ 1000, with dimensions of 0.150 inches×0.150 inches×0.120 inch space, with a 0.093 inch through hole 138.

Referring to FIG. 1, the EHD cartridge pump 100 of the disclosed embodiments also includes one or more alignment pins 150. The alignment pins 150 are configured to serve the dual purposes of providing redundant electrical connectivity as well as alignment, also referred to as self-alignment, of the first and second electrode pairs into the cartridge case body 102 of the EHD pump 100 during assembly. In one embodiment, the self-alignment utilizes the cartridge case body 102 as both a container and an alignment fixture. The self-alignment includes alignment of the gap 202 between pumping pairs, as well as aligning the axis of the through bores 218, The alignment pins 150 of FIG. 1 generally comprise any suitable conductive material. In one embodiment, the alignment pins 150 can comprise a brass or gold plated material. The alignment pins 150 can also be of a one-piece construction. The one piece construction of the alignment pins 150 insures reliable electrical connectivity and minimizes the potential for shorting.

The use of the alignment pins 150 provides for highly accurate placement of the first and second electrodes 210, 220 to maintain the critical gap geometry, or the first dimension 202 of FIG. 4, between the first and second, or positive and negative, electrodes, 210, 220 which is needed for optimum pump efficiency.

As is shown in the example of FIG. 1, there are four alignment pins 150. One end 152 of the alignment pin 150 is configured to be received in corresponding alignment pin opening 156 in the cartridge body 102. The other end 154 of the alignment pin 150 is received in a corresponding opening 211, 221 in a respective conductive bar member 210, 220.

In one embodiment, the end 152 of the alignment pin 150 is configured to extend or protrude out of the main housing or cartridge body 102 as shown in FIG. 3. This allows the end 152 to be coupled to a corresponding electrical connection, such as an electrical power source or a ground potential.

Figure 5:
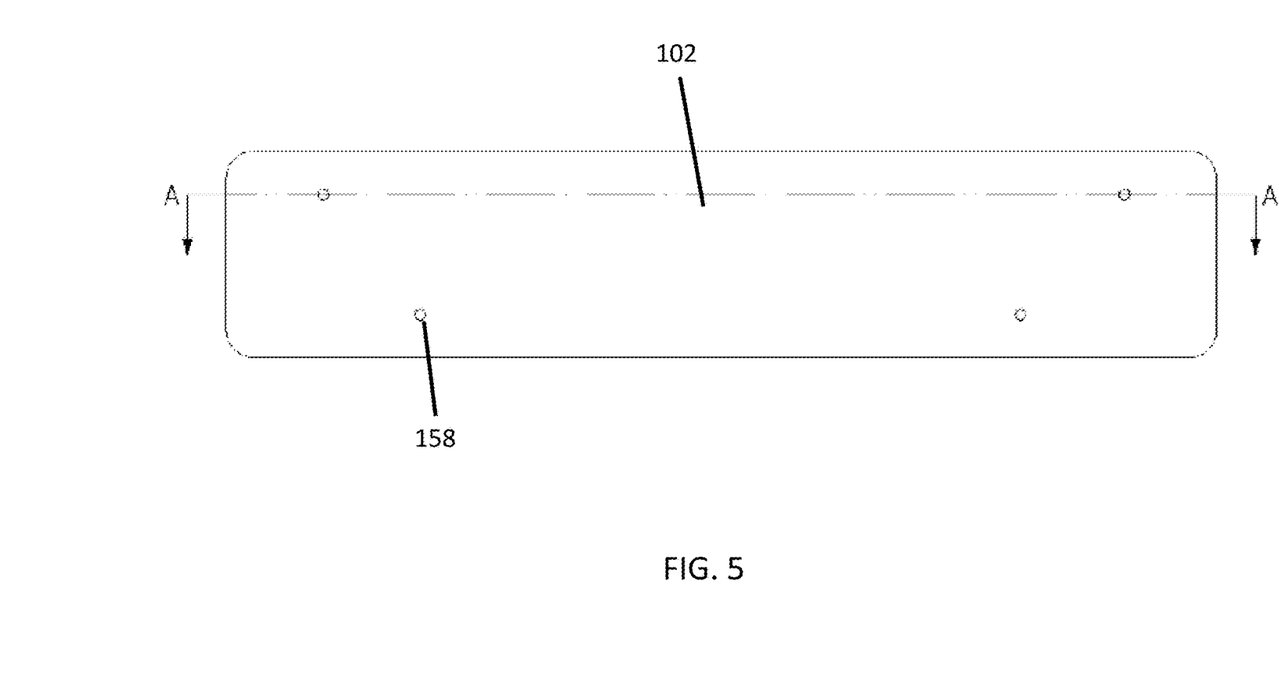
FIG. 5 is a bottom plan view of a micro-scale electro hydrodynamic modular cartridge pump incorporating aspects of the disclosed embodiments.

As shown in FIG. 5, a bottom portion of the cartridge body 102 includes one or more openings 158 that are configured to receive the end 152 of the respective alignment pins 150. Two of the alignment pins 150 are used to align the first electrode 210 with respect to the cartridge body 102, while two of the alignment pins 150 are used to align the second electrode 220 with respect to the cartridge body 102.

The alignment pins 150 are also used to provide electrical connections to the respective first electrode 210 and to the second electrode 220. In the example of FIG. 1, the first electrode 210 is the high voltage electrode and the second electrode 220 is the ground electrode. The corresponding alignment pins 150 can be used to an electrical connection to the source of electrical power for the first electrode 210 and an electrical connection to the electrical ground potential for the second electrode 220. The redundant alignment pin connections help mitigate the risk of potential connector failure that may arise, such as during assembly or under launch conditions.

Figure 6:
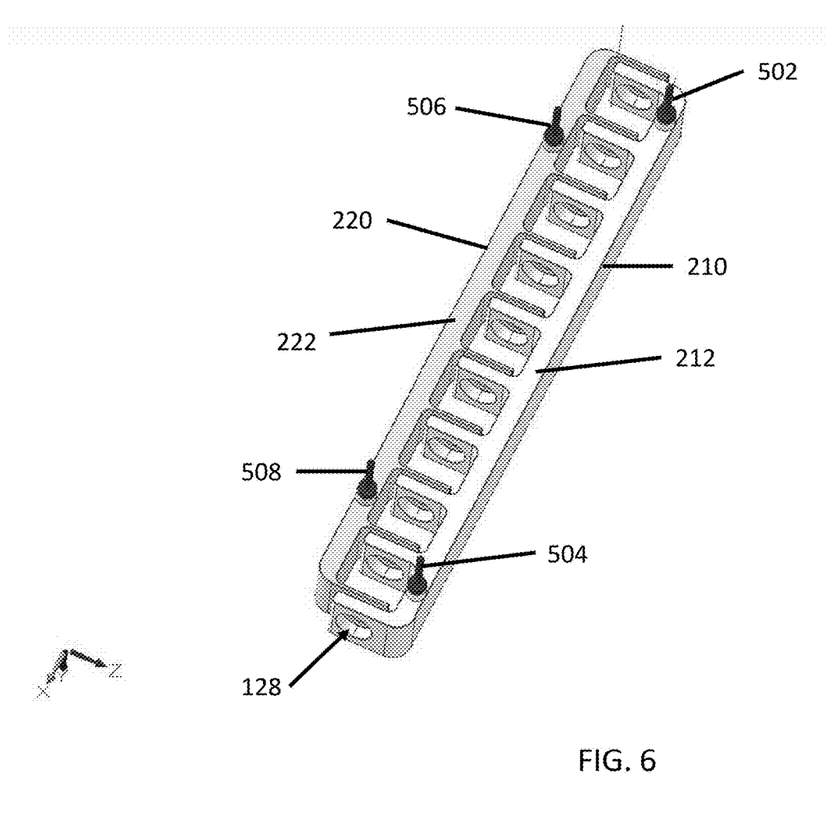
FIG. 6 is a perspective view illustrating first and second electrodes and alignment pins for a micro-scale electro hydrodynamic modular cartridge pump incorporating aspects of the disclosed embodiments.

FIG. 6 illustrates an example of a first electrode 210 and a second electrode 220 with corresponding alignment pins 150 installed therein. In this example, the first electrode 210 has two alignment pins 502, 504, while the second electrode 220 has two alignment pins 506, 508. The alignment pins 502, 504, 506, 508 in this example are generally disposed in the conductive bar portion 212, 214 of the respective first electrode 210 and second electrode 220. In alternate embodiments, the alignment pins 502, 504, 506 and 508 can be disposed in or along any suitable portion of the corresponding first and second electrode 210, 220 to provide the desired alignment, stability and electrical connections.

Figure 7:
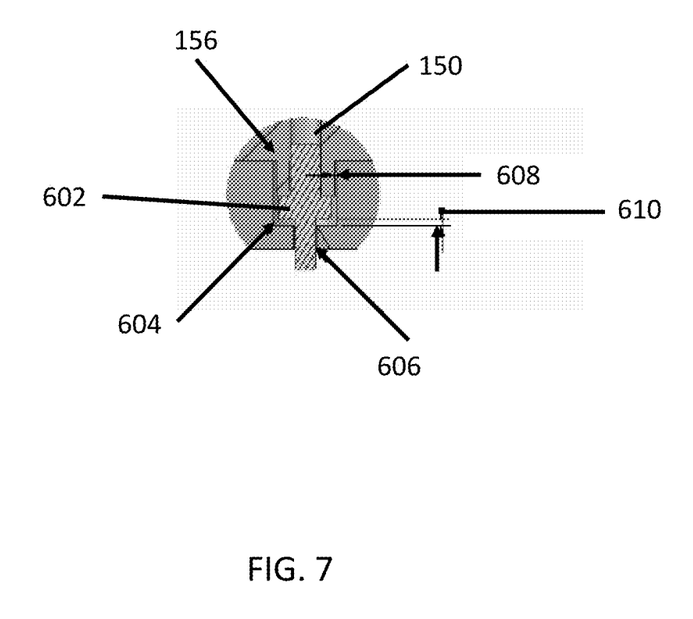
FIG. 7 is a cross-sectional view of a shoulder boss for a micro-scale electro hydrodynamic modular cartridge pump incorporating aspects of the disclosed embodiments.

Referring to FIG. 7, in one embodiment, the alignment pin 150 includes a shoulder portion or boss 602. The shoulder bosses 602 are generally configured to provide strength to the alignment pins 150 in shear mode as they keep the electrodes 210, 220 from moving. The shoulder bosses 602 are also configured to seal the alignment pins 150 by encapsulating the top, sides and bottom of the pin interface or alignment pin opening 156.

In the example of FIG. 7, the shoulder boss 602 is configured to be received in an upper portion of the alignment pin opening 156. As shown in FIG. 6, the upper portion 604 is wider in diameter than the lower portion 606 of the alignment pin opening 156. The alignment pin opening 156 is configured to be a close tolerance hole in order to maintain the first dimension 202 shown in FIG. 4. The size of the alignment pin opening 156 is sufficient to provide a bonding gap 608 between the alignment pin 150 and the walls of the alignment pin opening 150. A gap 610 is also provided for enabling resin flow for sealing the alignment pins 150 is the alignment pin opening 156.

Figure 8:
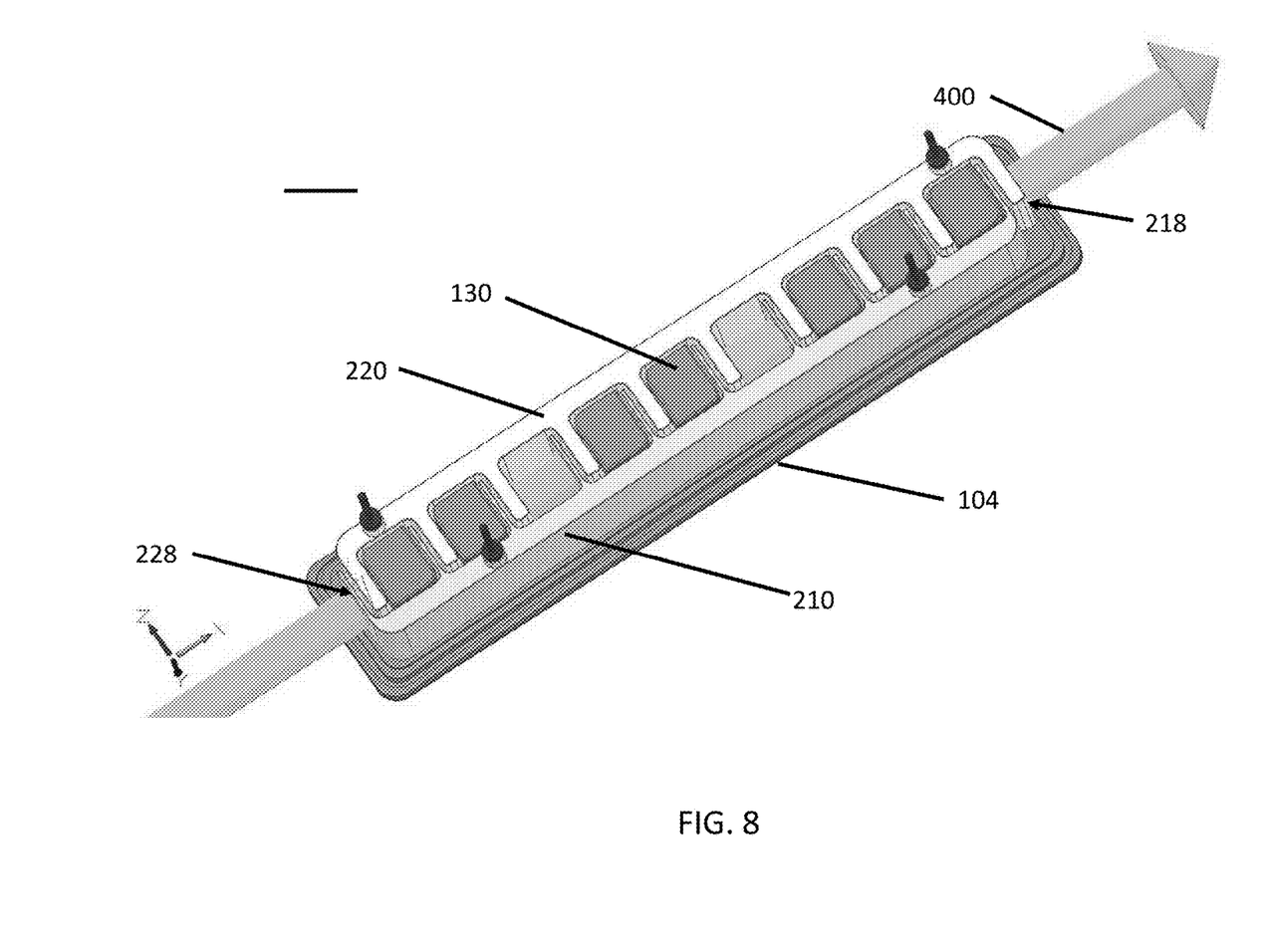
FIG. 8 illustrates a flow channel for a micro-scale electro hydrodynamic modular cartridge pump incorporating aspects of the disclosed embodiments.

Referring to FIG. 8, in one embodiment, a flow channel 400 is defined from one end 106 of the pump 100 to the other end 108 of the EHD modular cartridge pump 100. In this example, the flow channel 400 is shown extending from the opening 228 of the second electrode 220 through the opening 218 of the first electrode 210. The cartridge cover 104 is shown. As is described above, the elements 214 and 224, and spacers 130, will include corresponding openings that are aligned to define the flow channel 400. The flow channel 400 provides the dielectric fluid flow through the EHD modular cartridge pump 100. The flow channel 400 is defined by the openings 116, 118 in the ends 106, 108 of the cartridge body 102, the openings 218 in the first electrode 210, the openings 228 in the second electrode 220 and the openings 138 in the spacers 130.

Figure 9:
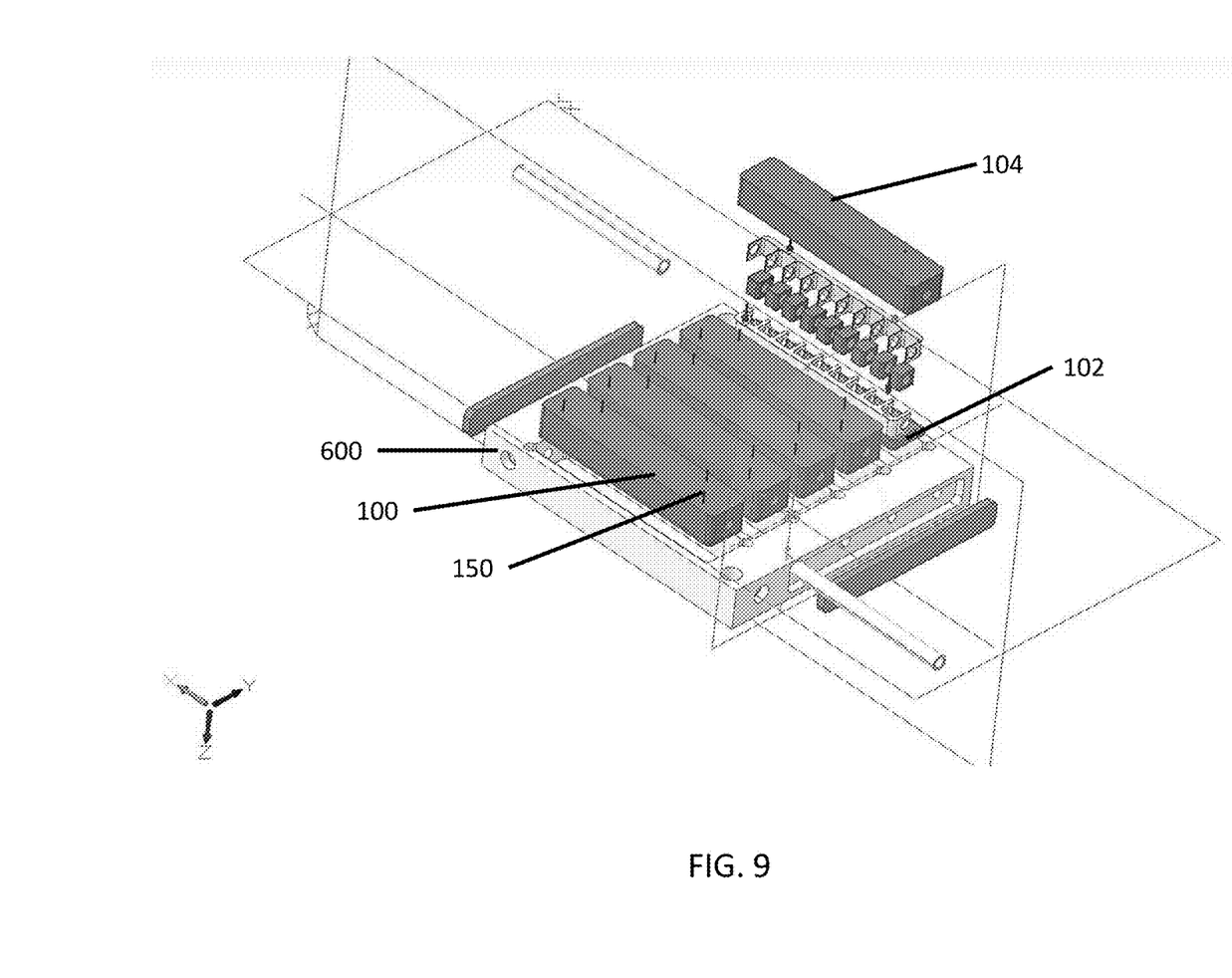
FIG. 9 illustrates a five EHD pump assembly with a parallel flow circuit incorporating aspects of the disclosed embodiments.
Figure 10:
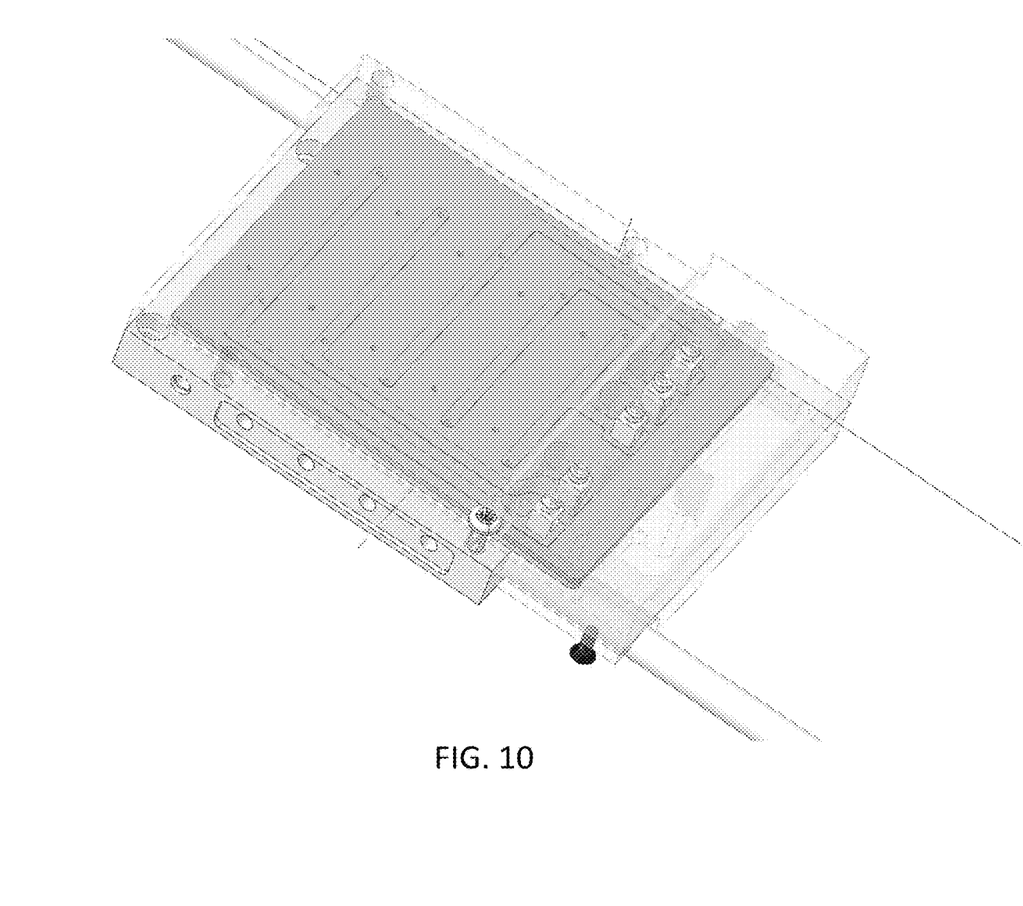
FIG. 10 illustrates an insular housing covering a high voltage plug assembly that provides independently fused circuits to each micro-scale electro hydrodynamic modular cartridge pump in a parallel electrical configuration.
Figure 11:
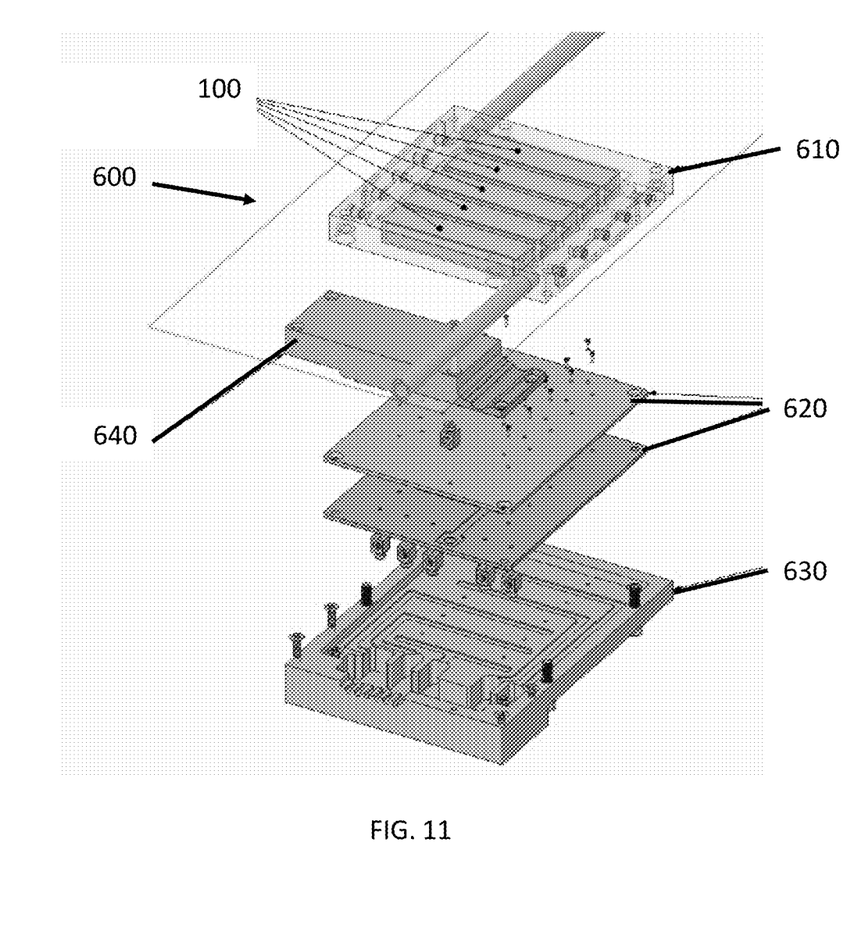
FIG. 11 is an assembly view of a five EHD pump assembly with a connector for a parallel flow circuit incorporating aspects of the disclosed embodiments.

FIGS. 9-11 illustrate how multiple EHD module cartridge pumps 100 can be utilized to cool an electronic box 600. In this example, a pump assembly 600 comprises there are five (5) EHD modular cartridge pumps 100 arranged in parallel. In the example of FIG. 11, a housing 610, such as a stainless steel housing, houses the modular cartridge pumps 100. An connector housing 630 plugs into the pump assembly of the five cartridge pumps 100. Electronic circuit boards 620 comprise part of the connector assembly. An insulator covers the bottom of the connector housing 630.

Other potential uses of the EHD modular cartridge pump 100 of the disclosed embodiments can include but are not limited to pumps for spot cooling of electronic boxes on spacecraft and low mass, low power cooling pumps for Cubesat and sub-assembly applications. Referring to FIGS. 10-11, the EHD modular cartridge pump 100 can enable built in pumping sections of cube and small satellite bus structures to have the pumps outside the electronics area and the fluid flowing through the main structure.

Figure 12:
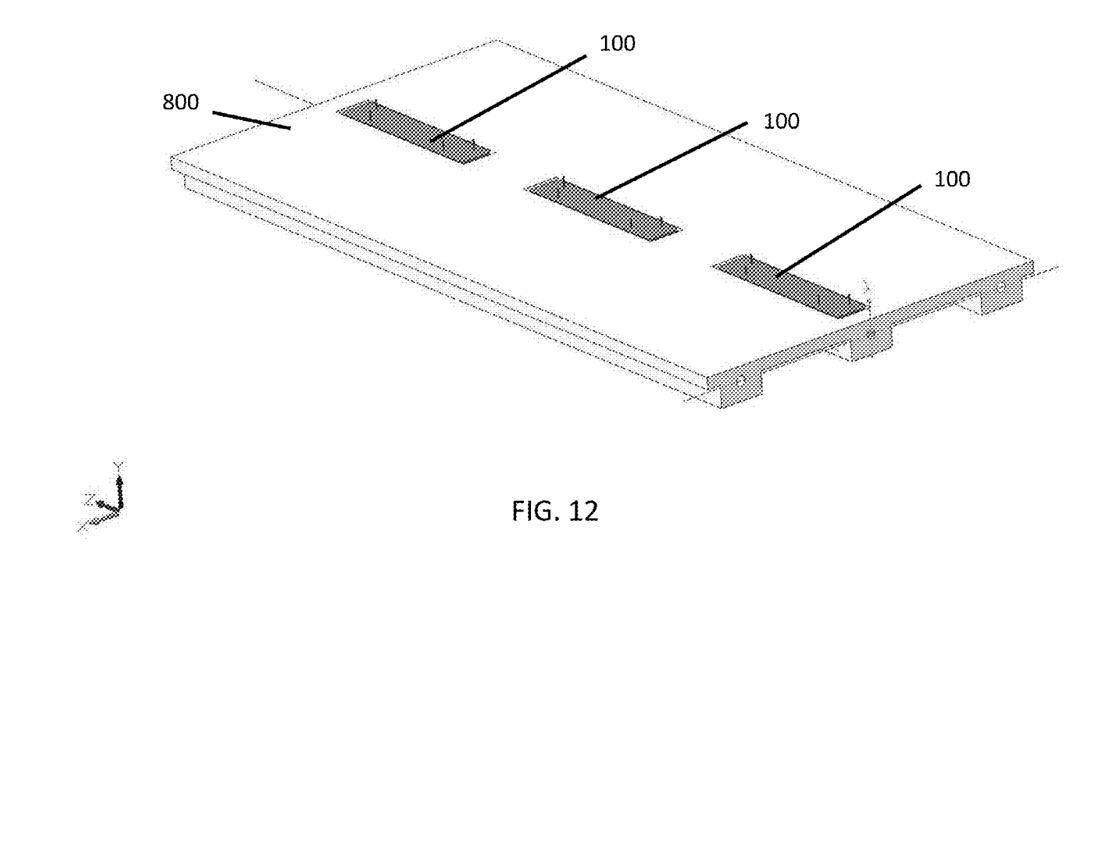
FIG. 12 illustrates embedded micro-scale electro hydrodynamic modular cartridges as part of a structural design for a system incorporating aspects of the disclosed embodiments.

FIG. 12 is an example of three pumps 100 arranged in a series configuration. In this example, the fluid is configured to flow from pump to pump over distance as opposed to multiple pumps flowing into a larger diameter channel. The three (3) EHD modular cartridge pumps 100 are integrated in a top cover 800 of an electronic equipment enclosure or structure. This would have the potential for electrically parallel pumping sections arrayed in a serial pattern for redundant or long distance pumping needs. The structure would become the pump manifold and the modular pump casings would have a standardized interface for this particular application.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements, which perform substantially the same function in substantially the same way to achieve the same result, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electro hydrodynamic pump apparatus, the apparatus comprising:
   a cartridge body member including an interior cavity portion and openings on either end of the body member;
   a first electrode member disposed within the interior cavity portion of the cartridge body member, the first electrode member comprising a conductive bar member with a plurality of spaced apart elements extending therefrom;
   a second electrode member disposed within the interior cavity portion of the cartridge body member, the second electrode member comprising a conductive bar with a plurality of spaced apart elements extending therefrom; and
   wherein the elements of the first electrode member are configure to be interspersed with the elements of the second electrode member when the first electrode member and the second electrode member are disposed within the interior cavity portion of the cartridge body member; a first element of the first electrode member is spaced apart from a first element of the second electrode member by a first distance and the first element of the second electrode member is spaced apart from a second element of the first electrode member by a second distance; and
   said device further comprising
   a spacer member disposed between an element of the second electrode member and an element of the first electrode member; and
   a fluid flow channel, the fluid flow channel extending from an opening on one end of the body member through an opening on an other end of the cartridge body member, the fluid flow channel being defined by corresponding openings in the spaced apart elements of the first electrode member, the spaced apart elements of the second electrode member and the spacer members.

2. The apparatus according to claim 1, wherein the second distance is greater than the first distance.

3. The apparatus according to claim 1, wherein the first electrode member is a voltage electrode and the second electrode member is a ground electrode.

4. The apparatus according to claim 1, wherein the spaced apart elements of the first electrode member are arranged substantially orthogonally to the conductive bar member of the first electrode member, and the spaced apart elements of the second electrode member are arranged substantially orthogonally to the conductive bar member of the second electrode member.

5. The apparatus according to claim 1, wherein a thickness of the first electrode member is thicker than a thickness of the second electrode member.

6. An electro hydrodynamic pump apparatus, the apparatus comprising:
   a cartridge body member including an interior cavity portion and openings on either end of the body member;
   a first electrode member disposed within the interior cavity portion of the cartridge body member, the first electrode member comprising a conductive bar member with a plurality of spaced apart elements extending therefrom;
   a second electrode member disposed within the interior cavity portion of the cartridge body member, the second electrode member comprising a conductive bar with a plurality of spaced apart elements extending therefrom; and wherein the elements of the first electrode member are configure to be interspersed with the elements of the second electrode member when the first electrode member and the second electrode member are disposed within the interior cavity portion of the cartridge body member; and wherein the elements of the first electrode member include an opening extending there-through and the elements of the second electrode member including an opening there-through, wherein the openings in the elements of the first electrode member are aligned with the openings in the elements of the second electrode member and the openings in either end of the cartridge body member.

7. The apparatus according to claim 6, wherein the openings in the elements of the first electrode member, the opening in the elements of the second electrode member and the openings in either of the cartridge body member form a fluid flow channel.

8. An electro hydrodynamic pump apparatus, the apparatus comprising:
a cartridge body member including an interior cavity portion and openings on either end of the body member;
a first electrode member disposed within the interior cavity portion of the cartridge body member, the first electrode member comprising a conductive bar member with a plurality of spaced apart elements extending therefrom;
a second electrode member disposed within the interior cavity portion of the cartridge body member, the second electrode member comprising a conductive bar with a plurality of spaced apart elements extending therefrom; and
wherein the elements of the first electrode member are configure to be interspersed with the elements of the second electrode member when the first electrode member and the second electrode member are disposed within the interior cavity portion of the cartridge body member; and
said apparatus further comprising one or more alignment pins disposed in the first electrode member and one or more alignment pins disposed in the second electrode member.

9. The apparatus according to claim 8, wherein the one or more alignment pins disposed in the first electrode member are electrically coupled to a source of electrical power and the one or more alignment pins disposed in the second electrode member are electrically coupled to an electrical ground potential.

10. The apparatus according to claim 8, wherein one end of the one or more alignment pins disposed in the first electrode member and one end of the one or more alignment pins disposed in the second electrode member are received in corresponding openings in the body member.

11. An electro hydrodynamic pump apparatus, the apparatus comprising:
a cartridge body member including an interior cavity portion and openings on either end of the body member;
a first electrode member disposed within the interior cavity portion of the cartridge body member, the first electrode member comprising a conductive bar member with a plurality of spaced apart elements extending therefrom;
a second electrode member disposed within the interior cavity portion of the cartridge body member, the second electrode member comprising a conductive bar with a plurality of spaced apart elements extending therefrom; and
wherein the elements of the first electrode member are configure to be interspersed with the elements of the second electrode member when the first electrode member and the second electrode member are disposed within the interior cavity portion of the cartridge body member; and
said apparatus further comprising an electrically conductive alignment pin disposed in each end of the first electrode member and an electrically conductive alignment pin disposed in each end of the second electrode member, each electrically conductive alignment pin of the first electrode member and the second electrode member configured to be received in a corresponding opening in the body member and maintain the first electrode member and second electrode member in a spaced apart relation from the body member.

* * * * *

UNITED STATES PATENT AND TRADEMARK OFFICE
CERTIFICATE OF CORRECTION

PATENT NO. : 10,461,621 B2
APPLICATION NO. : 14/981165
DATED : October 29, 2019
INVENTOR(S) : Matthew T. Showalter et al.

It is certified that error appears in the above-identified patent and that said Letters Patent is hereby corrected as shown below:

Please correct the title of invention from "MICRO SCALE ELECTRO HYRDODYNAMIC (EHD) MODULAR CARTRIDGE PUMP" to "MICRO SCALE ELECTRO HYDRODYNAMIC (EHD) MODULAR CARTRIDGE PUMP"

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*